(12) United States Patent
Deng (10) Patent No.: US 11,209,339 B2
(45) Date of Patent: Dec. 28, 2021

(54) METHOD AND SYSTEM FOR DETECTING PERFORMANCE OF ROLL-TO-ROLL DEVICE FOR PROCESSING FLEXIBLE MATERIAL AND COMPONENT THEREOF

(71) Applicant: GUANGDONG UNIVERSITY OF TECHNOLOGY, Guangzhou (CN)

(72) Inventor: Yaohua Deng, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 721 days.

(21) Appl. No.: 16/100,236

(22) Filed: Aug. 10, 2018

(65) Prior Publication Data

US 2019/0360893 A1 Nov. 28, 2019

(30) Foreign Application Priority Data

May 28, 2018 (CN) .......................... 201810523502.0

(51) Int. Cl.
 G01M 13/045 (2019.01)
 G01H 1/00 (2006.01)
 (Continued)

(52) U.S. Cl.
 CPC .......... G01M 13/045 (2013.01); G01H 1/003 (2013.01); G06N 3/0436 (2013.01); G06N 7/02 (2013.01)

(58) Field of Classification Search
 None
 See application file for complete search history.

(56) References Cited

U.S. PATENT DOCUMENTS

2006/0075311 A1  4/2006 Ranjan et al.
2010/0030492 A1* 2/2010 Kar .......................... F16C 19/52
                                                                    702/39

(Continued)

FOREIGN PATENT DOCUMENTS

CN   106153340 A * 11/2016
KR   101640798 B1 *  7/2016

OTHER PUBLICATIONS

Pan et al., "Bearing performance degradation assessment based on lifting Wavelet packet decomposition and fuzzy c-means" Mechanical Systems and Signal Processing 24 (2010) 559-566 (Year: 2010).*

(Continued)

Primary Examiner — John C Kuan (57) ABSTRACT

A method for detecting performance of a roll-to-roll device for processing flexible material comprises: obtaining a first fuzzy prototype and a second fuzzy prototype according to vibration data of all rollers working in a normal state; collecting the vibration data of all the rollers at a target time period, and extracting a second root mean square value and a second kurtosis value of the actual vibration data; and calculating membership degree functions of the second root mean square value, the second kurtosis value, the first fuzzy prototype and the second fuzzy prototype, and determining a performance state of a roll-to-roll device for processing flexible material within the target time period according to the membership degree functions. The method can accurately assess the performance of the roll-to-roll device for processing flexible material, so as to prevent the roll-to-roll device for processing flexible material from failing.

5 Claims, 5 Drawing Sheets

(51) Int. Cl.
  *G06N 7/02*   (2006.01)
  *G06N 3/04*   (2006.01)

(56) References Cited

U.S. PATENT DOCUMENTS

| 2011/0023503 A1 | 2/2011 | Wang et al. |
| 2012/0330577 A1* | 12/2012 | Kar .................. G01H 1/003 |
| | | 702/56 |
| 2015/0120901 A1 | 4/2015 | Baumgartner et al. |

OTHER PUBLICATIONS

Zhao, "The Study on Rotating Machinery Early Fault Diagnosis based on Principal Component Analysis and Fuzzy C-means Algorithm" Journal of Software, vol. 8, No. 3, Mar. 2013 (Year: 2013).*
Ma et al., "Fault Diagnosis of Bearing Based on Fuzzy Support Vector Machine" IEEE 2015 (Year: 2015).*
Shen et al., "A Monotonic Degradation Assessment Index of Rolling Bearings Using Fuzzy Support Vector Data Description and Running Time" Sensors 2012, 12, 10109-10135 (Year: 2012).*

\* cited by examiner

METHOD AND SYSTEM FOR DETECTING PERFORMANCE OF ROLL-TO-ROLL DEVICE FOR PROCESSING FLEXIBLE MATERIAL AND COMPONENT THEREOF

CROSS-REFERENCE TO RELATED APPLICATIONS

This application claims priority to Chinese Patent Application No. 201810523502.0 with a filing date of May 28, 2018. The content of the aforementioned applications, including any intervening amendments thereto, are incorporated herein by reference.

TECHNICAL FIELD

The present disclosure relates to the technical field of flexible material processing, and particularly to a method and system for detecting performance of a roll-to-roll device for processing flexible material, a computer readable storage medium and a roll-to-roll device for processing flexible material.

BACKGROUND OF THE PRESENT INVENTION

In recent years, a breakthrough has been made in the research of application of flexible films as substrate materials in wearable sensors, OLEDs and thin film solar cells. Roll-to-roll (R2R) is an efficient and low-cost continuous processing method for processing flexible thin film materials (or called as flexible board). R2R has attracted increasing attention in the industry and academia since it does not need a vacuum dust-free environment, a complex corrosion process and a huge waste liquid treatment project.

At present, the R2R method is a major international way for processing above flexible materials. However, since the flexible film belongs to anisotropic materials, deformation is diverse and uncertain. The deformation of the flexible film will be affected by external interference or internal changes to the performance of manufacturing device. The flexible film is prone to generate quality problems such as wrinkle, interlayer slipping, breakage, etc. The performance of the R2R manufacturing device is a bottleneck that restricts large-scale manufacturing of the flexible film. However, in the prior art, fault prediction methods for the R2R processing device of flexible material mainly focus on the identification of fault modes, i.e., faults can only be detected when the device fails. This method is a passive maintenance way. When a fault has been detected in the device, the flexible material produced has considerable quality problems. Therefore, the technical solution for passive maintenance of device in the prior art is not beneficial for production enterprises to realize maximum benefits of the manufacturing device.

Therefore, how to accurately evaluate the performance of the R2R device for processing flexible material so as to prevent the R2R device for processing flexible material from failing and improve the product quality of the flexible material from the perspective of fault prevention of the device is a technical problem to be solved currently by those skilled in the art.

SUMMARY OF PRESENT INVENTION

The purpose of the present disclosure is to provide a method and system for detecting performance of a roll-to-roll device for processing flexible material, a computer readable storage medium and a roll-to-roll (R2R) device for processing flexible material, in order to accurately evaluate the performance of the R2R device for processing flexible material so as to prevent the R2R device for processing flexible material from failing and improve the product quality of the flexible material from the perspective of the device.

To solve the above technical problems, the present disclosure provides a method for detecting performance of a R2R device for processing flexible material. The method comprises: calculating a first root mean square value and a first kurtosis value of vibration data of all rollers of a roll-to-roll device for processing flexible material working in a normal state; executing fuzzy division operation on the first root mean square value to obtain a first fuzzy prototype, and executing fuzzy division operation on the first kurtosis value to obtain a second fuzzy prototype; calculating a second root mean square value and a second kurtosis value of the vibration data of all the rollers of the roll-to-roll device for processing flexible material within a target time period; calculating a first membership degree function between the second root mean square value and the first fuzzy prototype corresponding to each of the rollers, and setting calculating results of the first membership degree function as first-type performance degradation index values, wherein the second root mean square value is an input sample of the first membership degree function; calculating a second membership degree function between the second kurtosis value and the second fuzzy prototype corresponding to each of the rollers, and setting calculating results of the second membership degree function as second-type performance degradation index values, wherein the second kurtosis value is an input sample of the second membership degree function; and determining a performance state of the roll-to-roll device for processing flexible material within the target time period according to all of the first-type performance degradation index values and all of the second-type performance degradation index values.

Optionally, the determining the performance state of the roll-to-roll device for processing flexible material within the target time period according to all of the first-type performance degradation index values and all of the second-type performance degradation index values comprises: respectively averaging the calculating results of all of the first-type performance degradation index values and all of the second-type performance degradation index values to obtain a first-type average performance degradation index value and a second-type average performance degradation index value, and determining the performance state of the roll-to-roll device for processing flexible material within the target time period according to the first-type average performance degradation index value and the second-type average performance degradation index value.

Optionally, the determining the performance state of the roll-to-roll device for processing flexible material within the target time period according to the first-type average performance degradation index value and the second-type average performance degradation index value comprises: judging whether a variation amount of the first-type average performance degradation index value is larger than a first preset value within a first preset time; if yes, determining that the performance state of the roll-to-roll device for processing flexible material is in a later stage of life; judging whether a variation amount of the second-type average performance degradation index value is larger than a second preset value within a second preset time; and if yes, determining that the performance state of the roll-to-roll device for processing flexible material is in an end stage of life.

Optionally, the calculating the first membership degree function between the second root mean square value and the first fuzzy prototype corresponding to each of the rollers comprises: calculating a first membership degree function $\mu_1$ of an unwinding roller between the second root mean square value and the first fuzzy prototype corresponding to the unwinding roller, wherein the first membership degree function of the unwinding roller is $$\mu_1(x_1) = e^{\frac{(x_1 - v_{ix_1})^2}{\sigma_{ix_1}^2}} ;$$

$x_1$ is the second root mean square value corresponding to the unwinding roller, $v_{ix_1}$ is a fuzzy clustering center of the first root mean square value corresponding to the unwinding roller in the first fuzzy prototype; and $\sigma_{ix_1}^2$ is a fuzzy division region width of the first root mean square value corresponding to the unwinding roller in the first fuzzy prototype; calculating a first membership degree function $\mu_2$ of a guiding roller between the second root mean square value and the first fuzzy prototype corresponding to the guiding roller, wherein the first membership degree function of the guiding roller is $$\mu_2(x_2) = e^{\frac{(x_2 - v_{ix_2})^2}{\sigma_{ix_2}^2}} ;$$

$x_2$ is the second root mean square value corresponding to the guiding roller, $v_{ix_2}$ is a fuzzy clustering center of the first root mean square value corresponding to the guiding roller in the first fuzzy prototype; and $\sigma_{ix_2}^2$ is a fuzzy division region width of the first root mean square value corresponding to the guiding roller in the first fuzzy prototype; calculating a first membership degree function $\mu_3$ of a driving roller between the second root mean square value and the first fuzzy prototype corresponding to the driving roller, wherein the first membership degree function of the driving roller is $$\mu_3(x_3) = e^{\frac{(x_3 - v_{ix_3})^2}{\sigma_{ix_3}^2}} ;$$

$x_3$ is the second root mean square value corresponding to the driving roller, $v_{ix_3}$ is a fuzzy clustering center of the first root mean square value corresponding to the driving roller in the first fuzzy prototype; and $\sigma_{ix_3}^2$ is a fuzzy division region width of the first root mean square value corresponding to the driving roller in the first fuzzy prototype; calculating a first membership degree function $\mu_4$ of a winding roller between the second root mean square value and the first fuzzy prototype corresponding to the winding roller, wherein the first membership degree function of the winding roller is $$\mu_4(x_4) = e^{\frac{(x_4 - v_{ix_4})^2}{\sigma_{ix_4}^2}} ;$$

$x_4$ is the second root mean square value corresponding to the winding roller, $v_{ix_4}$ is a fuzzy clustering center of the first root mean square value corresponding to the winding roller in the first fuzzy prototype; and $\sigma_{ix_4}^2$ is a fuzzy division region width of the first root mean square value corresponding to the winding roller in the first fuzzy prototype;

Correspondingly, the calculating the second membership degree function between the second kurtosis value and the second fuzzy prototype corresponding to each of the rollers comprises: calculating a second membership degree function $\mu_5$ of the unwinding roller between the second kurtosis value and the second fuzzy prototype corresponding to the unwinding roller, wherein the second membership degree function of the unwinding roller is $$\mu_5(x_5) = e^{\frac{(x_5 - v_{ix_5})^2}{\sigma_{ix_5}^2}} ;$$

$x_5$ is the second kurtosis value corresponding to the unwinding roller, $v_{ix_5}$ is a fuzzy clustering center of the first kurtosis value corresponding to the unwinding roller in the second fuzzy prototype; and $\sigma_{ix_5}^2$ a is a fuzzy division region width of the first kurtosis value corresponding to the unwinding roller in the second fuzzy prototype; calculating a second membership degree function $\mu_6$ of the guiding roller between the second kurtosis value and the second fuzzy prototype corresponding to the guiding roller, wherein the second membership degree function of the guiding roller is $$\mu_6(x_6) = e^{\frac{(x_6 - v_{ix_6})^2}{\sigma_{ix_6}^2}} ;$$

is the second kurtosis value corresponding to the guiding roller, $v_{ix_6}$ is a fuzzy clustering center of the first kurtosis value corresponding to the guiding roller in the second fuzzy prototype; and $\sigma_{ix_6}^2$ is a fuzzy division region width of the first kurtosis value corresponding to the guiding roller in the second fuzzy prototype; calculating a second membership degree function $\mu_7$ of the driving roller between the second kurtosis value and the second fuzzy prototype corresponding to the driving roller, wherein the second membership degree function of the driving roller is $$\mu_7(x_7) = e^{\frac{(x_7 - v_{ix_7})^2}{\sigma_{ix_7}^2}} ;$$

$x_7$ is the second kurtosis value corresponding to the driving roller, $v_{ix_7}$ is a fuzzy clustering center of the first kurtosis value corresponding to the driving roller in the second fuzzy prototype; and $\sigma_{ix_7}^2$ is a fuzzy division region width of the first kurtosis value corresponding to the driving roller in the second fuzzy prototype; and calculating a second membership degree function $\mu_8$ of the winding roller between the second kurtosis value and the second fuzzy prototype corresponding to the winding roller, wherein the second membership degree function of the winding roller is $$\mu_8(x_8) = e^{\frac{(x_8 - v_{ix_8})^2}{\sigma_{ix_8}^2}} ;$$

$x_8$ is the second kurtosis value corresponding to the winding roller; $v_{ix_8}$ is a fuzzy clustering center of the first kurtosis value corresponding to the winding roller in the second fuzzy prototype; and $\sigma_{ix_8}^2$ is a fuzzy division region width of the first kurtosis value corresponding to the winding roller in the second fuzzy prototype.

Optionally, after determining the performance state of the roll-to-roll device for processing flexible material within the target time period according to all of the first-type performance degradation index values and all of the second-type performance degradation index values, the method further comprises: judging whether the performance state satisfies normal working requirements to the roll-to-roll device for processing flexible material; and if not, outputting prompt information for replacing the rollers.

The present disclosure further provides a system for detecting performance of a roll-to-roll device for processing flexible material. The performance detection system comprises: a normal vibration data calculating module for calculating a first root mean square value and a first kurtosis value of vibration data of all rollers of the roll-to-roll device working in a normal state; a fuzzy division module for executing fuzzy division operation on the first root mean square value to obtain a first fuzzy prototype, and executing fuzzy division operation on the first kurtosis value to obtain a second fuzzy prototype; a data collection module for calculating a second root mean square value and a second kurtosis value of the vibration data of all the rollers of the roll-to-roll device for processing flexible material within a target time period; a first membership degree calculating module for calculating a first membership degree function between the second root mean square value and the first fuzzy prototype corresponding to each of the rollers, and setting calculating results of the first membership degree function as first-type performance degradation index values, wherein the second root mean square value is an input sample of the first membership degree function; a second membership degree calculating module for calculating a second membership degree function between the second kurtosis value and the second fuzzy prototype corresponding to each of the rollers, and setting calculating results of the second membership degree function as second-type performance degradation index values, wherein the second kurtosis value is an input sample of the second membership degree function; and a performance detection module for determining a performance state of a roll-to-roll device for processing flexible material within the target time period according to all of the first-type performance degradation index values and all of the second-type performance degradation index values.

Optionally, the performance detection module is specifically configured to average the calculating results of all of the first-type performance degradation index values and all of the second-type performance degradation index values respectively to obtain a first-type average performance degradation index value and a second-type average performance degradation index value, and to determine the performance state of the roll-to-roll device for processing flexible material within the target time period according to the first-type average performance degradation index value and the second-type average performance degradation index value.

Optionally, the performance detection module comprises: a first-type performance judging unit for judging whether a variation amount of the first-type average performance degradation index value is larger than a first preset value within a first preset time, and if yes, determining that the performance state of the roll-to-roll device for processing flexible material is in a later stage of life; and a second-type performance judging unit for judging whether a variation amount of the second-type average performance degradation index value is larger than a second preset value within a second preset time; and if yes, determining that the performance state of the roll-to-roll device for processing flexible material is in an end stage of life.

The present disclosure further provides a computer readable storage medium for storing the computer programs; when the computer programs are executed, the above method is realized.

The present disclosure further provides a roll-to-roll device for processing flexible material, comprising: triaxial acceleration vibration sensors, a memory and a processor. The triaxial acceleration vibration sensors are installed on the unwinding roller, the guiding roller, the driving roller and the winding roller respectively and configured for collecting vibration data. The memory stores the computer programs. The processor, when invoking the computer programs in the memory, realizes the steps of the method for detecting performance of the roll-to-roll device for processing flexible material.

The present disclosure provides a method for detecting performance of a roll-to-roll device for processing flexible material, comprising: calculating a first root mean square value and a first kurtosis value of vibration data of all rollers of the roll-to-roll device working in a normal state; executing fuzzy division operation on the first root mean square value to obtain a first fuzzy prototype, and executing fuzzy division operation on the first kurtosis value to obtain a second fuzzy prototype; calculating a second root mean square value and a second kurtosis value of the vibration data of all the rollers of the roll-to-roll device for processing flexible material within a target time period; calculating a first membership degree function between the second root mean square value and the first fuzzy prototype corresponding to each of the rollers, and setting calculating results of the first membership degree function as first-type performance degradation index values, wherein the second root mean square value is an input sample of the first membership degree function; calculating a second membership degree function between the second kurtosis value and the second fuzzy prototype corresponding to each of the rollers, and setting calculating results of the second membership degree function as second-type performance degradation index values, wherein the second kurtosis value is an input sample of the second membership degree function; and determining a performance state of a roll-to-roll device for processing flexible material within the target time period according to all of the first-type performance degradation index values and all of the second-type performance degradation index values.

Since the performance degradation of the roll-to-roll device for processing flexible material is mainly reflected in that the vibration of each roller on the device is greatly changed compared with the vibration of the device working in normal state, the present disclosure uses the vibration data of the rollers on the roll-to-roll device for processing flexible material as a reference for evaluating the performance of the device. Firstly, the present disclosure uses the first root mean square value and the first kurtosis value of the vibration data of all the rollers working in the normal state and conducts fuzzy division on the first root mean square value and the first kurtosis value to obtain a first fuzzy prototype and a second fuzzy prototype, and collects the vibration data of the roll-to-roll device for processing flexible material in the actual working process to extract the second root mean square value and the second kurtosis value of the vibration data in the actual working state. The membership degrees of the second root mean square value and the second kurtosis value with the fuzzy prototypes (i.e., the similarity between the vibration data in the actual working state and the vibration data in normal state) are computed through the membership degree functions. The membership degree functions are set as the performance degradation index values of the rollers, and the performance state of the roll-to-roll device for processing flexible material is evaluated according to the performance degradation index values. Through the method of using standard vibration data as the reference for evaluating and then calculating the similarity between the vibration data in actual working state and the vibration data in normal state, the present disclosure can accurately assess the performance of the roll-to-roll device for processing flexible material, so as to prevent the roll-to-roll device for processing flexible material from failing and improve the product quality of the flexible material from the perspective of fault prevention of the device. The present disclosure further provides a system for detecting performance of a roll-to-roll device for processing flexible material, a computer readable storage medium and a roll-to-roll device for processing flexible material, which have the above beneficial effects which will not be repeated herein.

DESCRIPTION OF THE DRAWINGS

In order to make embodiments of the present disclosure described more clearly, the drawings associated to the description of the embodiments will be illustrated concisely hereinafter. Obviously, the drawings described below are only some embodiments according to the disclosure. Numerous drawings therein will be apparent to one of ordinary skill in the art based on the drawings described in the disclosure without creative efforts.

DETAILED DESCRIPTION OF PREFERRED EMBODIMENTS

In order to make the objects, technical solution and advantages of the present disclosure more clear, the present disclosure will be further described in detail with reference to the accompanying drawings and embodiments below. It should be understood that embodiments described here are only for explaining the present disclosure and the disclosure, however, should not be construed as limited to the embodiment as set forth herein. All other embodiments obtained by those of ordinary skill in the art under the teaching of the embodiments described herein without creative efforts will fall into the protection scope of the present disclosure.

Figure 1:
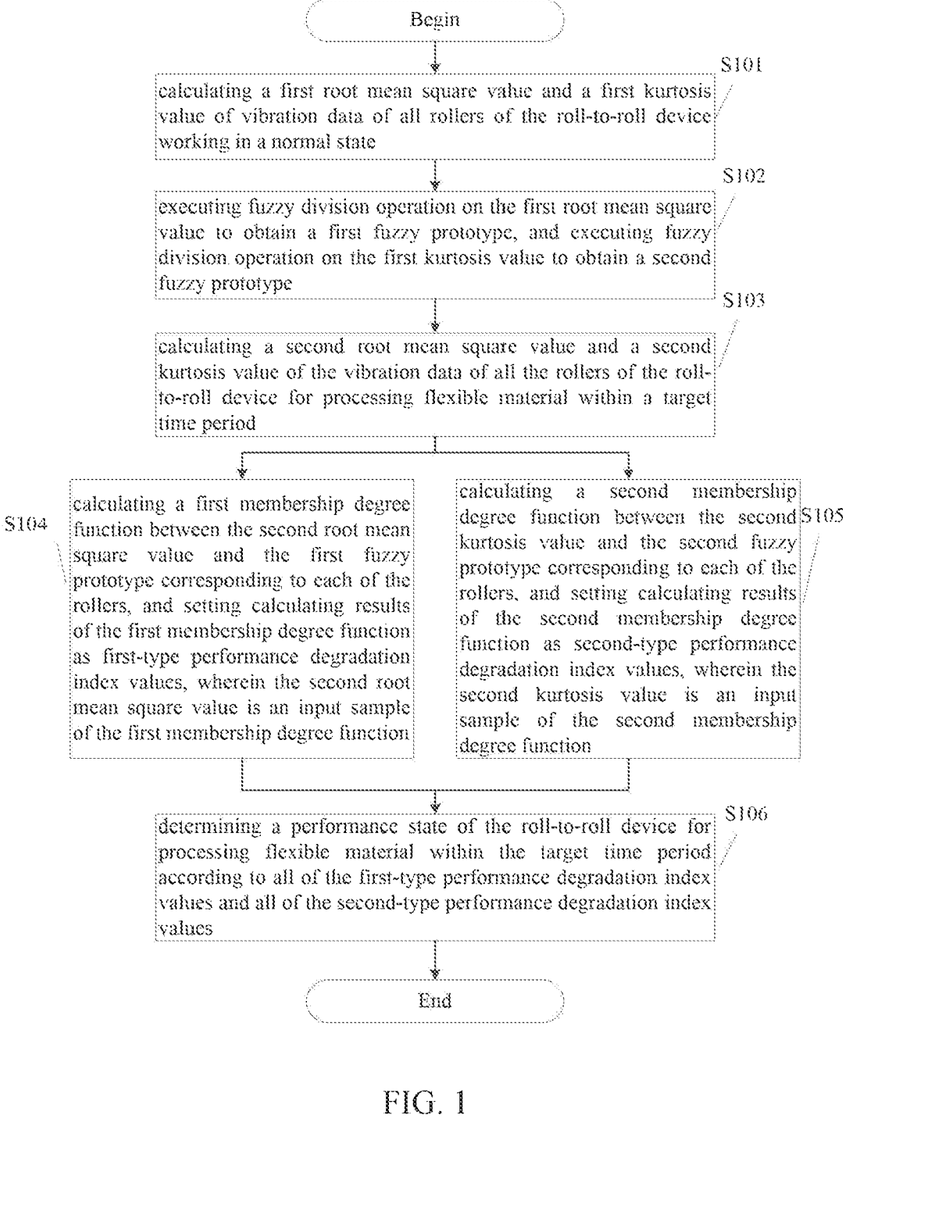
FIG. 1 is a flow chart of a method for detecting performance of a roll-to-roll device for processing flexible material according to embodiments of the present disclosure.

FIG. 1 is a flow chart of a method for detecting performance of a roll-to-roll device for processing flexible material according to embodiments of the present disclosure.

The method comprises the following specific steps:

S101: calculating a first root mean square value and a first kurtosis value of vibration data of all rollers of a roll-to-roll device for processing flexible material working in a normal state.

Since performance degradation of the roll-to-roll device for processing flexible material is a non-linear process from the normal state to the fault state, the present embodiment firstly collects the first root mean square value and the first kurtosis value of the vibration data when the roll-to-roll device for processing flexible material conducts roll-to-roll processing in a normal state. Further, before this step, the vibration data of all the rollers of the roll-to-roll device for processing flexible material in the normal state exist by default. Sources of the vibration data of all the rollers in the normal state are not limited, which may be data of a simulation roll-to-roll device for processing flexible material in an ideal working state or data collected from a new and best-performance roll-to-roll device for processing flexible material in a practical test.

It can be understood that generally, if the vibration frequency of the device is within a low frequency range (less than 10 Hz), displacement can be selected as the vibration data of the device. Experience indicates that for most of machines with a vibration frequency within a medium frequency range (10 Hz<f<1000 Hz), speed can be used to evaluate vibration strength, i.e., speed amplitude data can be used as the vibration data.

S102: executing fuzzy division operation on the first root mean square value to obtain a first fuzzy prototype, and executing fuzzy division operation on the first kurtosis value to obtain a second fuzzy prototype.

It should be indicated that the roll-to-roll device for processing flexible material may include many kinds of rollers, such as an unwinding roller, a guiding roller, a driving roller and a winding roller, and the specific quantity of each kind of rollers is not limited herein. Fuzzy division operation refers to classifying data sets which are not marked by categories according to a certain division principle, i.e., classifying feature parameters with high similarity into the same category as far as possible, while classifying feature parameters with low similarity into other classes. The reason of executing fuzzy division on the root mean square value and the kurtosis value in this step is that: the root mean square values of some vibration data are too large, and the positions of the root mean square values exceed the obtained clustering center and a dividing radius, resulting in that the finally obtained prediction result of the performance degradation of the device is inaccurate. Therefore, the fuzzy division is executed on the first root mean square value and the first kurtosis value, so as to obtain the fuzzy prototypes with high accuracy of performance evaluation. It should be indicated that the fuzzy prototypes corresponding to a corresponding quantity of the rollers shall be computed in this step for the roll-to-roll device for processing flexible material.

S103: calculating a second root mean square value and a second kurtosis value of the vibration data of all the rollers of the roll-to-roll device for processing flexible material within a target time period.

The purpose of this step is to acquire the current performance state of the roll-to-roll device for processing flexible material. Therefore, before this step, the vibration data collected within the target time period exist by default, and may be the recent vibration data of the roll-to-roll device for processing flexible material and may also be the vibration data collected within any time period during the use process of the roll-to-roll device for processing flexible material. High-sensitivity triaxial acceleration vibration sensors can be respectively installed right above the rollers, and when the device is operated, the vibration data of all the rollers can be collected in the processing course. It should be indicated that the present embodiment realizes performance detection through similarity comparison between the vibration data within the target time period and the vibration data in the normal state, and further realizes prediction of performance degradation through the membership degrees of the fuzzy prototypes with the second root mean square value and the second kurtosis value. It should be indicated that there is no logical dependency between this step and S102, but the operation in S104 must be executed through the operation steps of S102 and S103.

S104: calculating a first membership degree function between the second root mean square value and the first fuzzy prototype corresponding to each of the rollers, and setting calculating results of the first membership degree function as first-type performance degradation index values, wherein the second root mean square value is an input sample of the first membership degree function.

The physical meaning of the membership degree function is to reflect the similarity relationship between the input sample and the fuzzy prototype. If the input sample is away from the prototype, the membership degree function is close to 0; and if the input sample is near the prototype, the membership degree function is close to 1. Because this step is to evaluate the performance state of the roll-to-roll device for processing flexible material according to the similarity between the input sample (the second root mean square value) and the first fuzzy prototype, the calculation result of the first membership degree function can be set as the performance degradation index of the roller. Because the roll-to-roll device for processing flexible material includes multiple rollers, the first-type performance degradation indexes of all the rollers need to be calculated in this step. It should be indicated that when the first membership degree function is calculated, the roller corresponding to the first fuzzy prototype and the roller corresponding to the second mean square root value are the same roller. For example, two first fuzzy prototypes corresponding to roller a and roller b are calculated in S102. In fact, the first fuzzy prototype x corresponding to roller a and the first fuzzy prototype y corresponding to roller b are different. When the first membership degree function between the second mean square root of roller a and the first fuzzy prototype needs to be calculated, although the first fuzzy prototype x and the first fuzzy prototype y belong to the first fuzzy prototype, the first fuzzy prototype x corresponding to roller a shall be used to calculate.

S105: calculating a second membership degree function between the second kurtosis value and the second fuzzy prototype corresponding to each of the rollers, and setting calculating results of the second membership degree function as second-type performance degradation index values, wherein the second kurtosis value is an input sample of the second membership degree function.

Because this step is to evaluate the performance state of the roll-to-roll device for processing flexible material according to the similarity between the input sample (the second kurtosis value) and the second fuzzy prototype, the calculation result of the second membership degree function can be set as the performance degradation index of the roller. Because one roll-to-roll device for processing flexible material includes multiple rollers, the second-type performance degradation indexes of all the rollers need to be calculated in this step. It should be indicated that when the second membership degree function is calculated, the roller corresponding to the second fuzzy prototype and the roller corresponding to the second kurtosis value are the same roller. Refer to the examples in S104 for relevant examples.

S106: determining the performance state of the roll-to-roll device for processing flexible material within the target time period according to all of the first-type performance degradation index values and all of the second-type performance degradation index values.

This step is based on the calculation of S104 and S105 for the performance degradation indexes of all the rollers. Because the performance state of the roll-to-roll device for processing flexible material is influenced by the performance degradation indexes of all the rollers, the performance state of the roll-to-roll device for processing flexible material within the target time period can be determined according to all of the first-type performance degradation index values and all of the second-type performance degradation index values.

Because the roll-to-roll device for processing flexible material has the characteristics of multiple stations and continuous manufacturing, when a serious performance degradation problem or fault problem occurs on one roller, the working condition and the performance of the whole device will be affected. The direct performance state of each roller is related to each other. Therefore, the average value of the addition of the membership degree functions of the rollers can be taken as the performance degradation index of the processing device, which can reflect the performance state of the whole processing device quickly and accurately. On one hand, misjudgment for the performance state of the device can be avoided; and on the other hand, the fault of the device can be predicted, thereby realizing timely maintenance of the device. As a preferred implementation manner, when the performance state of each roller has the same degree of influence on the performance of the roll-to-roll device for processing flexible material, all the performance degradation index values (including the first-type performance degradation index values and the second-type performance degradation index values) can be averaged to obtain a first-type average performance degradation index value and a second-type average performance degradation index value; and the performance state of the device is determined according to the first-type average performance degradation index value and the second-type average performance degradation index value.

Because the degradation of performance of the roll-to-roll device for processing flexible material is mainly reflected in that the vibration condition of each roller on the device is greatly changed compared with the vibration condition under normal state, the present disclosure uses the vibration data of the rollers on the roll-to-roll device for processing flexible material as a reference for evaluating the performance of the device. Firstly, the present disclosure uses time domain feature parameters of the vibration data of all the rollers in the normal state as the reference for performance evaluation, and collects the actual vibration data of the roll-to-roll device for processing flexible material in the actual working process to extract the time domain feature parameters of the vibration data. The membership degrees between the actual vibration features and the fuzzy prototypes (i.e., the similarity between the actual vibration data and the standard vibration) are computed through the membership degree functions. The membership degree functions are set as the performance degradation index values of the rollers, and the performance state of the roll-to-roll device for processing flexible material is evaluated according to the performance degradation index values. Through the method of using the vibration data in the normal state as the reference for evaluating and then calculating the similarity between the actual vibration data and the vibration data under normal state, the present disclosure can accurately assess the performance of the roll-to-roll device for processing flexible material, so as to prevent the roll-to-roll device for processing flexible material from failing and improve the product quality of the flexible material from the perspective of the device.

Figure 2:
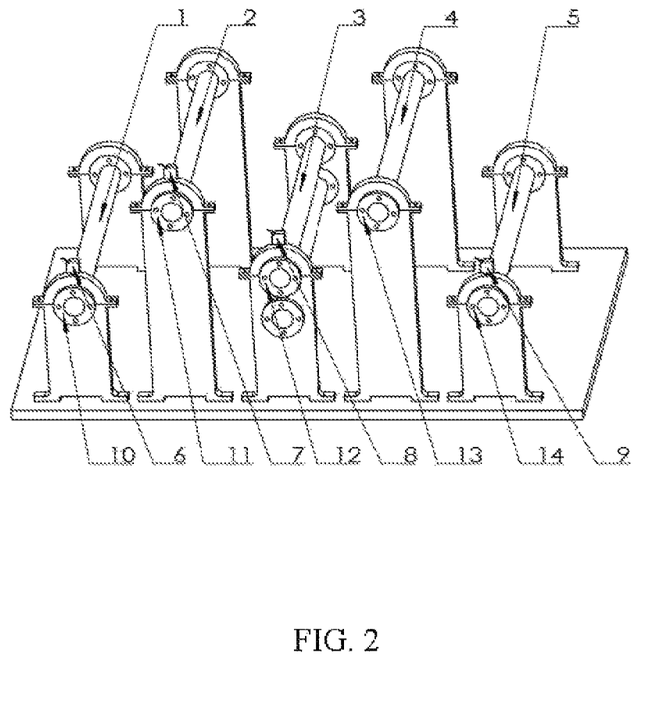
FIG. 2 is a structural schematic diagram of a roll-to-roll device for processing flexible material.

It should be indicated that the roll-to-roll device for processing flexible material comprises the unwinding roller, the guiding roller, the driving roller and the winding roller. FIG. 2 is a structural schematic diagram of a roll-to-roll device for processing flexible material. In the figure, 1 represents the unwinding roller, 2 and 4 represent the guiding rollers; 3 represents the driving roller, 5 represents the winding roller, 6, 7, 8 and 9 represent the vibration sensors; and 10, 11, 12, 13 and 14 represent bearings. Based on the roll-to-roll device for processing flexible material shown in FIG. 3, the operation in S104 and S105 in above embodiments may specifically include:

Step 1: calculating a first membership degree function $\mu_1$ of the unwinding roller between the second root mean square value and the first fuzzy prototype corresponding to the unwinding roller, wherein the first membership degree function of the unwinding roller is $$\mu_1(x_1) = e^{-\frac{(x_1 - v_{ix_1})^2}{\sigma_{ix_1}^2}};$$

$x_1$ is the second root mean square value corresponding to the unwinding roller, $v_{ix_1}$ is a fuzzy clustering center of the first root mean square value corresponding to the unwinding roller in the first fuzzy prototype; and $\sigma_{ix_1}^2$ is a fuzzy division region width of the first root mean square value corresponding to the unwinding roller in the first fuzzy prototype;

Step 2: calculating a first membership degree function $\mu_2$ of the guiding roller between the second root mean square value and the first fuzzy prototype corresponding to the guiding roller, wherein the first membership degree function of the guiding roller is $$\mu_2(x_2) = e^{-\frac{(x_2 - v_{ix_2})^2}{\sigma_{ix_2}^2}};$$

$x_2$ is the second root mean square value corresponding to the guiding roller; $v_{ix_2}$ is a fuzzy clustering center of the first root mean square value corresponding to the guiding roller in the first fuzzy prototype; and $\sigma_{ix_2}^2$ is a fuzzy division region width of the first root mean square value corresponding to the guiding roller in the first fuzzy prototype;

Step 3: calculating a first membership degree function $\mu_3$ of the driving roller between the second root mean square value and the first fuzzy prototype corresponding to the driving roller, wherein the first membership degree function of the driving roller is $$\mu_3(x_3) = e^{-\frac{(x_3 - v_{ix_3})^2}{\sigma_{ix_3}^2}};$$

$x_3$ is the second root mean square value corresponding to the driving roller, $v_{ix_3}$ is a fuzzy clustering center of the first root mean square value corresponding to the driving roller in the first fuzzy prototype; and $\sigma_{ix_3}^2$ is a fuzzy division region width of the first root mean square value corresponding to the driving roller in the first fuzzy prototype;

Step 4: calculating a first membership degree function $\mu_4$ of the winding roller between the second root mean square value and the first fuzzy prototype corresponding to the winding roller, wherein the first membership degree function of the winding roller is $$\mu_4(x_4) = e^{-\frac{(x_4 - v_{ix_4})^2}{\sigma_{ix_4}^2}};$$

$x_4$ is the second root mean square value corresponding to the winding roller, $v_{ix_4}$ is a fuzzy clustering center of the first root mean square value corresponding to the winding roller in the first fuzzy prototype; and $\sigma_{ix_4}^2$ is a fuzzy division region width of the first root mean square value corresponding to the winding roller in the first fuzzy prototype;

Step 5: calculating a second membership degree function $\mu_5$ of the unwinding roller between the second kurtosis value and the second fuzzy prototype corresponding to the unwinding roller, wherein the second membership degree function of the unwinding roller is $$\mu_5(x_5) = e^{-\frac{(x_5 - v_{ix_5})^2}{\sigma_{ix_5}^2}};$$

$x_5$ is the second kurtosis value corresponding to the unwinding roller, $v_{ix_5}$ is a fuzzy clustering center of the first kurtosis value corresponding to the unwinding roller in the second fuzzy prototype; $\sigma_{ix_5}^2$ and a is a fuzzy division region width of the first kurtosis value corresponding to the unwinding roller in the second fuzzy prototype;

Step 6: calculating a second membership degree function $\mu_6$ of the guiding roller between the second kurtosis value and the second fuzzy prototype corresponding to the guiding roller, wherein the second membership degree function of the guiding roller is $$\mu_6(x_6) = e^{-\frac{(x_6 - v_{ix_6})^2}{\sigma_{ix_6}^2}};$$

$x_6$ is the second kurtosis value corresponding to the guiding roller, $v_{ix_6}$ is a fuzzy clustering center of the first kurtosis value corresponding to the guiding roller in the second fuzzy prototype; and $\sigma_{ix_6}^2$ is a fuzzy division region width of the first kurtosis value corresponding to the guiding roller in the second fuzzy prototype;

Step 7: calculating a second membership degree function $\mu_7$ of the driving roller between the second kurtosis value and the second fuzzy prototype corresponding to the driving roller, wherein the second membership degree function of the driving roller is $$\mu_7(x_7) = e^{\frac{(x_7 - v_{ix_7})^2}{\sigma_{ix_7}^2}};$$

$x_7$ is the second kurtosis value corresponding to the driving roller, $v_{ix_7}$ is a fuzzy clustering center of the first kurtosis value corresponding to the driving roller in the second fuzzy prototype; and $\sigma_{ix_7}^2$ is a fuzzy division region width of the first kurtosis value corresponding to the driving roller in the second fuzzy prototype; and Step 8: calculating a second membership degree function $\mu_8$ of the winding roller between the second kurtosis value and the second fuzzy prototype corresponding to the winding roller, wherein the second membership degree function of the winding roller is $$\mu_8(x_8) = e^{\frac{(x_8 - v_{ix_8})^2}{\sigma_{ix_8}^2}};$$

$x_8$ is the second kurtosis value corresponding to the winding roller, $v_{ix_8}$ is a fuzzy clustering center of the first kurtosis value corresponding to the winding roller in the second fuzzy prototype; and $\sigma_{ix_8}^2$ is a fuzzy division region width of the first kurtosis value corresponding to the winding roller in the second fuzzy prototype.

Figure 3:
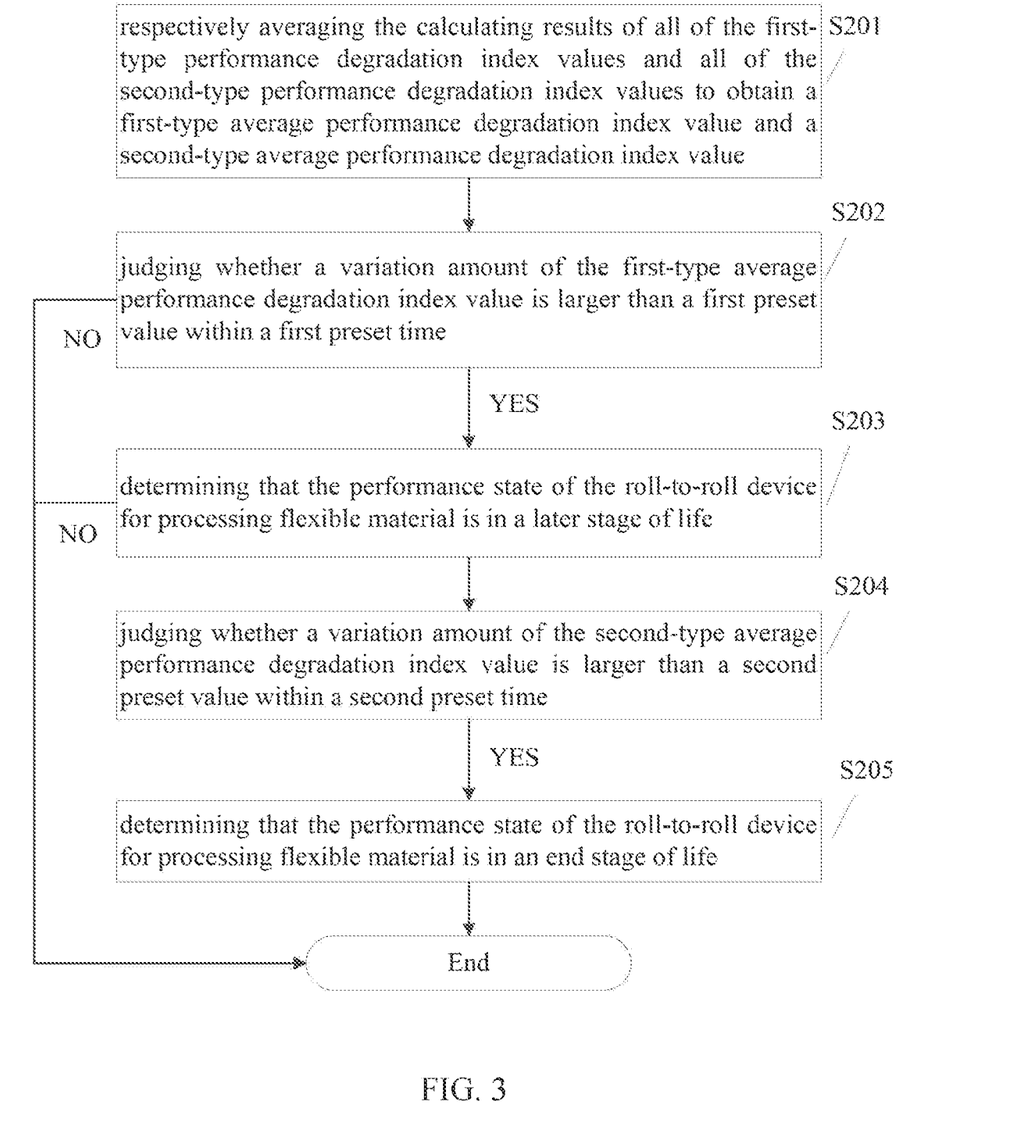
FIG. 3 is a flow chart of a method for determining a performance state of a roll-to-roll device for processing flexible material according to embodiments of the present disclosure.

On the basis that the roll-to-roll device for processing flexible material comprises the unwinding roller, the guiding roller, the driving roller and the winding roller, see FIG. 3. FIG. 3 is a flow chart of a method for determining a performance state of a roll-to-roll device for processing flexible material according to embodiments of the present disclosure, and specifically describes the operation of S106 in the above embodiment. Specific steps may include:

S201: averaging all of the first-type performance degradation index values to obtain a first-type average performance degradation index value and averaging all of the second-type performance degradation index values to obtain a second-type average performance degradation index value.

The specific calculating process of this step is as follows: all of the first-type performance degradation index values are averaged according to an average performance formula to obtain the first-type average performance degradation index value $T_{X_{rms}}$, wherein the first-type average performance formula is $$T_{X_{rms}} = \left( e^{\frac{(x_1 - v_{ix_1})^2}{\sigma_{ix_1}^2}} + e^{\frac{(x_2 - v_{ix_2})^2}{\sigma_{ix_2}^2}} + e^{\frac{(x_3 - v_{ix_3})^2}{\sigma_{ix_3}^2}} + e^{\frac{(x_4 - v_{ix_4})^2}{\sigma_{ix_4}^2}} \right) / 4;$$

and all of the second-type performance degradation index values are averaged according to an average performance formula to obtain the second-type average performance degradation index value $T'_{X_{rms}}$, wherein the second-type average performance formula is $$T'_{X_{rms}} = \left( e^{\frac{(x_5 - v_{ix_5})^2}{\sigma_{ix_5}^2}} + e^{\frac{(x_6 - v_{ix_6})^2}{\sigma_{ix_6}^2}} + e^{\frac{(x_7 - v_{ix_7})^2}{\sigma_{ix_7}^2}} + e^{\frac{(x_8 - v_{ix_8})^2}{\sigma_{ix_8}^2}} \right) / 4.$$

S202: judging whether a variation amount of the first-type average performance degradation index value is larger than a first preset value within a first preset time; if yes, entering S203; if not, ending the process.

S203: determining that the performance state of the roll-to-roll device for processing flexible material is in a later stage of life.

S204: judging whether a variation amount of the second-type average performance degradation index value is larger than a second preset value within a second preset time; if yes, entering S205; if not, ending the process.

S205: determining that the performance state of the roll-to-roll device for processing flexible material is in an end stage of life.

The derivation process of the fuzzy clustering center and the fuzzy division region width in the present embodiment is as follows:

A minimum target function, subjected to c fuzzy divisions, of the feature parameters of various rollers is solved:

$$\text{Min}\{J(X; U, V)\} = \sum_{k=1}^{n} \sum_{t=1}^{C} (u_{tk})^m (D_{tkM_t})^2 \quad (3.1)$$

so as to obtain a fuzzy division matrix and a category center of the feature parameter $x_t$. In the formula: J represents an error sum of square between the feature parameter of the vibration data within the target time period and the fuzzy prototype; $X=\{x_1, x_2, \ldots, x_n\}$ represents an n-dimensional input roller feature parameter set; $U=[u_{tk}]$ represents a fuzzy division matrix of the input roller feature parameter set X ($u_{tk}$ is the membership degree in which the kth feature parameter belongs to the $t^{th}$ category); $V=\{v_1, v_2, \ldots v_c\}$ represents a clustering center set; $m \in [1, +\infty)$ represents a clustering fuzzy weighted index number, and is a proper positive number (generally, m=2); and $D_{tkM_t}^2$ represents a norm of square inner product of a distance from the data $x_t$ in an n-dimensional data space to the clustering center $v_t$, i.e., $$D_{tkM_t}^2 = x_k - v_{tM_t}^2 = (x_k - v_t)^T M_t (x_k - v_i) \quad (3.2)$$

In the formula, $$M_t = \det(W_t)^{\frac{1}{n}} \cdot W_t^{-1},$$

wherein $W_t$ represents a positive definite symmetric matrix. The following covariance:

$$W_t = \left[ \sum_{k=1}^{N} (u_{tk})^m (x_k - v_t)(x_k - v_t)^T \right] / \sum_{k=1}^{N} (u_{tk})^m \quad (3.3)$$

is used to estimate regulation for $M_t$, thereby realizing division for the input roller feature parameter set.

The formula (3.1) is a divided minimum target function, and is a basis for solving a feature parameter fuzzy division matrix and a clustering center. When the condition $$\sum_{t=1}^{c} u_{tk} = 1, k = 1, 2, \ldots, N$$

is satisfied, the formula (3.1) can use lagrangian operator synthesis constraints and the target function to form a new target function by using a lagrangian operator λ:

$$\text{Min}\{\bar{J}(X; U, V, \lambda)\} = \sum_{t=1}^{c}\sum_{k=1}^{N}(u_{tk})^m (D_{tkM_t})^2 + \sum_{k=1}^{N}\lambda\left(\sum_{t=1}^{c}u_{tk} - 1\right) \quad (3.4)$$

wherein λ is a constant; the principle of dividing the feature parameters of the rollers by using AFCM is to seek an optimal (U, V, λ) combination so as to divide the feature parameters of various rollers to minimum values when $\bar{J}$ (X; U, V, λ) satisfies the constraints; and an iteration method is used to compute an approximate minimum value of the target function $\bar{J}$(X; U, V, λ), which is a most common method for solving the division problem for the feature parameters.

$$\sum_{t=1}^{c} u_{tk} = 1, u_{tk} \in [0, 1] \quad (3.5)$$

Under the condition of satisfying the formula (3.5), in the process of solving the minimum value of the target function $\bar{J}$(X; U, V, λ), the necessary optimality conditions of the formula (3.4) are:

$$\frac{\partial \bar{J}}{\partial v_t} = \sum_{k=1}^{N}(u_{tk})^m \frac{\partial}{\partial v_t}[(x_k - v_t)^T M_t(x_k - v_t)] = 0 \quad (3.6)$$

$$\frac{\partial \bar{J}}{\partial \mu_t} = [m(u_{tk})^{m-1}(D_{tkM_t})^2 + \lambda] = 0$$

$$\frac{\partial \bar{J}}{\partial \lambda} = \sum_{k=1}^{N}(u_{tk} - 1) = 0, 1 \le i \le c, 1 \le t \le N$$

Thus:

$$\begin{cases} u_{tk} = \left[\sum_{j=1}^{c}\left(\frac{d_{tk}}{d_{jk}}\right)^{\frac{2}{m-1}}\right]^{-1} \\ v_t = \left[\sum_{k=1}^{N}(u_{tk})^m\right]^{-1}\sum_{k=1}^{N}(u_{tk})^m x_k \end{cases} \quad t = 1, 2, \ldots, c; k = 1, 2, \ldots N \quad (3.7)$$

Figure 4:
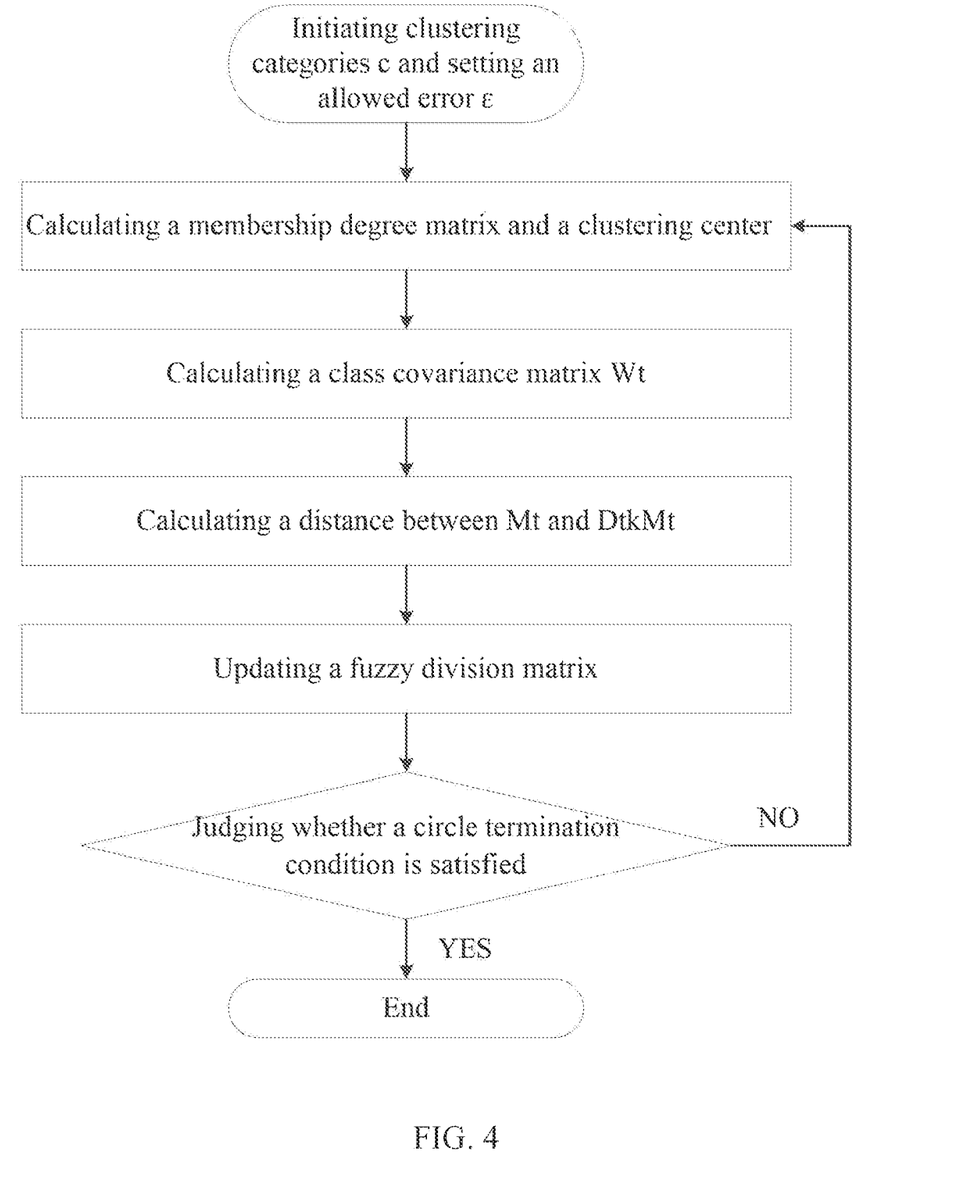
FIG. 4 is a flow chart of fuzzy division of input roller feature parameters based on adaptive fuzzy C-means (AFCM) method.

FIG. 4 is a flow chart of fuzzy division of input roller feature parameters based on AFCM method. The quantity of clustering categories is set as c; a fuzzy degree weighted index number is set as m; and an allowed error of algorithm iteration termination satisfies ε>0. When $$\sum_{t=1}^{c} u_{tk} = 1, k = 1, 2, \ldots, N$$

is satisfied, a feature parameter fuzzy division matrix U is initialized; the iteration number satisfies l=1, 2, . . . ; and the following steps are repeated:

① calculating the fuzzy clustering center $v_t^{(l)}$ according to the formula (3.7):

$$v_t^{(l)} = \left[\sum_{k=1}^{N}(u_{tk}^{(l-1)})^m\right]^{-1} \cdot \sum_{k=1}^{N}(u_{tk}^{(l-1)})^m x_k$$

② calculating a class covariance according to the formula (3.3):

$$W_t = \left[\sum_{k=1}^{N}(u_{tk}^{(l-1)})^m (x_k - v_t^{(l)})(x_k - v_t^{(l)})^T\right] \Big/ \sum_{k=1}^{N}(u_{tk}^{(l-1)})^m$$

③ calculating a distance between $M_t^l$ and $D_{tkM_1}^2$:

$$M_t^l = \det(W_t)^{\frac{1}{n}} \cdot W_t^{-1}, D_{tkM_t}^2 = (x_k - v_t^{(l)})^T M_t(x_k - v_t^{(l)})$$

④ updating the fuzzy division matrix according to the formula (3.7):

$$u_{tk}^{(l)} = \left[\sum_{j=1}^{c}\left(\frac{D_{tkM_t}}{D_{jkM_t}}\right)^{\frac{2}{r-1}}\right]^{-1}$$

Repeating in this way until iteration termination condition is satisfied, i.e., $\|u^{(l)} - u^{(l+1)}\| \le \varepsilon$, wherein l≥1, and then the algorithm is terminated. Otherwise, returning to step ①.

If the input feature parameter fuzzy division matrix after dividing through AFCM is U=[$u_{tk}$] and c fuzzy category number is $R_t$(1≤t≤c), then the category center $v_{tq}$ and the corresponding variance $\sigma_{tq}^2$ of $R_t$ are:

$$v_{tq} = \left[\sum_{k=1}^{N}(u_{tk})^m\right]^{-1} \cdot \sum_{k=1}^{N}(u_{tk})^m x_k \quad (3.8)$$

$$\sigma_{tq}^2 = \sum_{k=1}^{N}(u_{tk})^m (q_k - v_{tq})^2 \cdot \left[\sum_{k=1}^{N}(u_{tk})^m\right]^{-1} \quad t = 1, 2, \ldots, c$$

In the formula, $v_{tq}$ is a category center value; $\sigma_{tq}^2$ is a division region width of input data; $u_{tk}^m$ is a membership degree value that the kth sample $x_k$ belongs to the $t^{th}$ category; Euclidian distance is used to calculate; m is a fuzzy coefficient of fuzzy clustering; and $q_k$ is a category number value.

③ Calculation formulas of the feature value and the kurtosis value:

It is assumed that the signal sequence of the collected vibration data points is x. If X={x(1), x(2), . . . , x($N_1$)} is a vibration data sequence collected by the vibration acceleration sensor within each sampling time interval and the discrete representation of the sampled vibration data x(i) is x(t), then N is the number of sampling points and T is a cycle. Common time domain feature value extraction includes:

(1) The root mean square value $X_{rms}$ is defined as:

$$X_{rms} = \sqrt{\lim_{T\to\infty}\frac{1}{T}\int_0^T X^2(i)dt} = \sqrt{\frac{1}{N}\sum_{i=1}^N x_i^2} \qquad (2.12)$$

then the discrete computation formula is:

$$X_{rms} = \sqrt{\frac{1}{N}\sum_{t=1}^N x(t)^2} \qquad (2.13)$$

(2) Kurtosis Value $$K_f = \frac{K}{\delta^2} \qquad (2.22)$$

In the formula:

$$K = \left[N \cdot \sum_{t=1}^N x(t)^4\right]^{-1} \cdot X_{rms}^{-4}$$

$$\delta^2 = \frac{1}{N}\sum_{t=1}^N \left[x(t) - \frac{1}{N}\sum_{t=1}^N x(t)\right]^2$$

Figure 5:
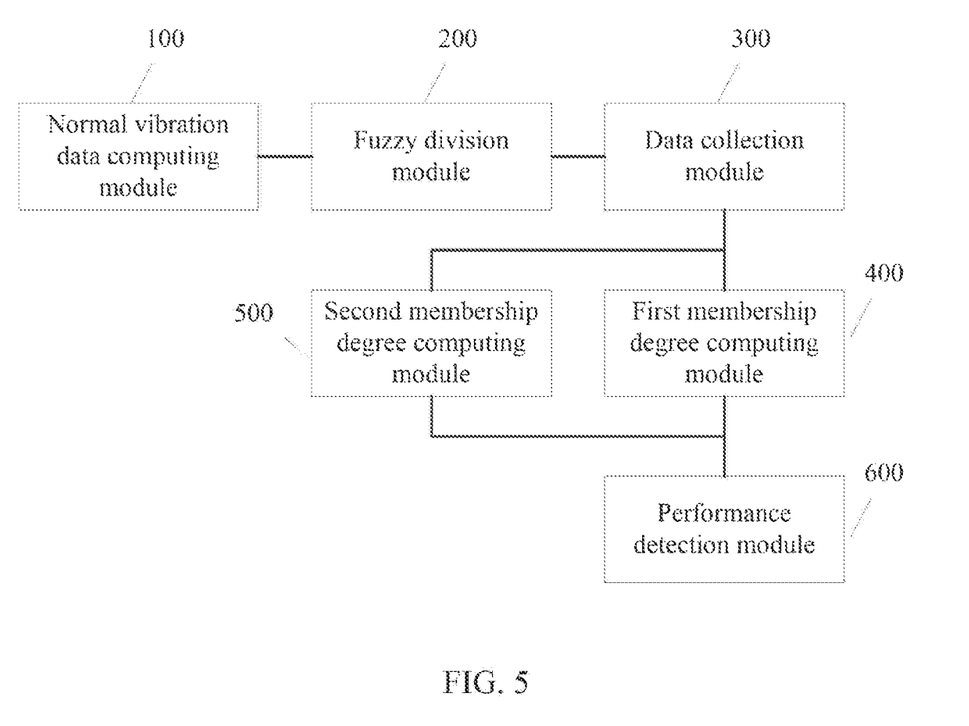
FIG. 5 is a structural schematic diagram of a system for detecting performance of a roll-to-roll device for processing flexible material according to embodiments of the present disclosure.

FIG. 5 is a structural schematic diagram of a system for detecting performance of a roll-to-roll device for processing flexible material according to embodiments of the present disclosure.

The system may include: a normal vibration data calculating module 100 for calculating a first root mean square value and a first kurtosis value of vibration data of all rollers of a roll-to-roll device for processing flexible material working in a normal state; a fuzzy division module 200 for executing fuzzy division operation on the first root mean square value to obtain a first fuzzy prototype, and executing fuzzy division operation on the first kurtosis value to obtain a second fuzzy prototype; a data collection module 300 for calculating a second root mean square value and a second kurtosis value of the vibration data of all the rollers of the roll-to-roll device for processing flexible material within a target time period; a first membership degree calculating module 400 for calculating a first membership degree function between the second root mean square value and the first fuzzy prototype corresponding to each of the rollers, and setting calculating results of the first membership degree function as first-type performance degradation index values, wherein the second root mean square value is an input sample of the first membership degree function; a second membership degree calculating module 500 for calculating a second membership degree function between the second kurtosis value and the second fuzzy prototype corresponding to each of the rollers, and setting calculating results of the second membership degree function as second-type performance degradation index values, wherein the second kurtosis value is an input sample of the second membership degree function; and a performance detection module 600 for determining a performance state of a roll-to-roll device for processing flexible material within the target time period according to all of the first-type performance degradation index values and all of the second-type performance degradation index values.

Further, the performance detection module 600 is specifically configured to average the calculating results of all of the first-type performance degradation index values and all of the second-type performance degradation index values respectively to obtain a first-type average performance degradation index value and a second-type average performance degradation index value, and to determine the performance state of the roll-to-roll device for processing flexible material within the target time period according to the first-type average performance degradation index value and the second-type average performance degradation index value.

Further, the performance detection module 600 comprises: a first-type performance judging unit for judging whether a variation amount of the first-type average performance degradation index value is larger than a first preset value within a first preset time, and if yes, determining that the performance state of the roll-to-roll device for processing flexible material is in a later stage of life; and a second-type performance judging unit for judging whether a variation amount of the second-type average performance degradation index value is larger than a second preset value within a second preset time; and if yes, determining that the performance state of the roll-to-roll device for processing flexible material is in a later stage of life.

Further, the first membership degree calculating module 400 comprises: a first membership degree calculating unit of the unwinding roller, for calculating a first membership degree function $\mu_1$ of the unwinding roller between the second root mean square value and the first fuzzy prototype corresponding to the unwinding roller, wherein the first membership degree function of the unwinding roller is $$\mu_1(x_1) = e^{-\frac{(x_1 - v_{ix_1})^2}{\sigma_{ix_1}^2}} \quad ;$$

$x_1$ is the second root mean square value corresponding to the unwinding roller; $v_{ix_1}$ is a fuzzy clustering center of the first root mean square value corresponding to the unwinding roller in the first fuzzy prototype; and $\sigma_{ix_1}^2$ is a fuzzy division region width of the first root mean square value corresponding to the unwinding roller in the first fuzzy prototype; a first membership degree calculating unit of the guiding roller, for calculating a first membership degree function $\mu_2$ of the guiding roller between the second root mean square value and the first fuzzy prototype corresponding to the guiding roller, wherein the first membership degree function of the guiding roller is $$\mu_2(x_2) = e^{-\frac{(x_2 - v_{ix_2})^2}{\sigma_{ix_2}^2}} \quad ;$$

$x_2$ is the second root mean square value corresponding to the guiding roller; $v_{ix_1}$ is a fuzzy clustering center of the first root mean square value corresponding to the guiding roller in the first fuzzy prototype; and $\sigma_{ix_2}^2$ is a fuzzy division region width of the first root mean square value corresponding to the guiding roller in the first fuzzy prototype; a first membership degree calculating unit of the driving roller, for calculating a first membership degree function $\mu_3$ of the driving roller between the second root mean square value and the first fuzzy prototype corresponding to the driving roller, wherein the first membership degree function of the driving roller is $$\mu_3(x_3) = e^{-\frac{(x_3 - v_{ix_3})^2}{\sigma_{ix_3}^2}} \;;$$

$x_3$ is the second root mean square value corresponding to the driving roller, $v_{ix_1}$ is a fuzzy clustering center of the first root mean square value corresponding to the driving roller in the first fuzzy prototype; and $\sigma_{ix_3}^2$ is a fuzzy division region width of the first root mean square value corresponding to the driving roller in the first fuzzy prototype; and a first membership degree calculating unit of the winding roller, for calculating a first membership degree function $\mu_4$ of the winding roller between the second root mean square value and the first fuzzy prototype corresponding to the winding roller, wherein the first membership degree function of the winding roller is $$\mu_4(x_4) = e^{-\frac{(x_4 - v_{ix_4})^2}{\sigma_{ix_4}^2}} \;;$$

$x_4$ is the second root mean square value corresponding to the winding roller; $v_{ix_4}$ is a fuzzy clustering center of the first root mean square value corresponding to the winding roller in the first fuzzy prototype; and $\sigma_{ix_4}^2$ is a fuzzy division region width of the first root mean square value corresponding to the winding roller in the first fuzzy prototype.

Further, the second membership degree calculating module 500 comprises: a second membership degree calculating unit of the unwinding roller, for calculating a second membership degree function $\mu_5$ of the unwinding roller between the second kurtosis value and the second fuzzy prototype corresponding to the unwinding roller, wherein the second membership degree function of the unwinding roller is $$\mu_5(x_5) = e^{-\frac{(x_5 - v_{ix_5})^2}{\sigma_{ix_5}^2}} \;;$$

$x_5$ is the second kurtosis value of the actual vibration data of the unwinding roller; $v_{ix_5}$ is a fuzzy clustering center of the standard kurtosis value of the actual vibration data of the unwinding roller in the second fuzzy prototype; and $\sigma_{ix_5}^2$ is a fuzzy division region width of the standard kurtosis value of the actual vibration data of the unwinding roller in the fuzzy prototype; a second membership degree calculating unit of the guiding roller, for calculating a second membership degree function $\mu_6$ of the guiding roller between the second kurtosis value and the second fuzzy prototype corresponding to the guiding roller, wherein the second membership degree function of the guiding roller is $$\mu_6(x_6) = e^{-\frac{(x_6 - v_{ix_6})^2}{\sigma_{ix_6}^2}} \;;$$

$x_6$ is the second kurtosis value of the actual vibration data of the guiding roller, $v_{ix_6}$ is a fuzzy clustering center of the standard kurtosis value of the actual vibration data of the guiding roller in the fuzzy prototype; and $\sigma_{ix_6}^2$ is a fuzzy division region width of the standard kurtosis value of the actual vibration data of the guiding roller in the fuzzy prototype; a second membership degree calculating unit of the driving roller, for calculating a second membership degree function $\mu_7$ of the driving roller between the second kurtosis value and the second fuzzy prototype corresponding to the driving roller, wherein the second membership degree function of the driving roller is $$\mu_7(x_7) = e^{-\frac{(x_7 - v_{ix_7})^2}{\sigma_{ix_7}^2}} \;;$$

$x_7$ is the second kurtosis value of the actual vibration data of the driving roller, $v_{ix_7}$ is a fuzzy clustering center of the standard kurtosis value of the actual vibration data of the driving roller in the fuzzy prototype; and $\sigma_{ix_7}^2$ is a fuzzy division region width of the standard kurtosis value of the actual vibration data of the driving roller in the second fuzzy prototype; and a second membership degree calculating unit of the winding roller, for calculating a second membership degree function $\mu_8$ of the winding roller between the second kurtosis value and the second fuzzy prototype corresponding to the winding roller, wherein the second membership degree function of the winding roller is $$\mu_8(x_8) = e^{-\frac{(x_8 - v_{ix_8})^2}{\sigma_{ix_8}^2}} \;;$$

$x_8$ is the second kurtosis value of the actual vibration data of the winding roller; $v_{ix_8}$ is a fuzzy clustering center of the standard kurtosis value of the actual vibration data of the winding roller in the second fuzzy prototype; and $\sigma_{ix_8}^2$ is a fuzzy division region width of the standard kurtosis value of the actual vibration data of the winding roller in the fuzzy prototype.

Because the embodiments of the system part correspond to the embodiments of the method part, see the description of the embodiments of the method part for the embodiments of the system part which will not be repeated herein.

The present disclosure further provides a computer readable storage medium in which a computer program is stored. The computer program, when executed, can realize the steps according to the above embodiments. The storage medium may include: various media such as a USB flash disk, a mobile hard disk, a read-only memory (ROM), a random access memory (RAM), a magnetic disc or a compact disc and the like which can store program codes.

The present disclosure further provides a roll-to-roll device for processing flexible material. The device may comprise: triaxial acceleration vibration sensors, a memory and a processor. The triaxial acceleration vibration sensors are installed on the unwinding roller, the guiding roller, the driving roller and the winding roller respectively and for collecting vibration data. The memory stores the computer programs. The processor, when invoking the computer programs in the memory, can realize the steps according to the above embodiments. Of course, the roll-to-roll device for processing flexible material can also comprise various network interfaces, power supplies and other components.

Each embodiment in the description is described in a progressive way. The difference of each embodiment from each other is the focus of explanation. The same and similar parts among all of the embodiments can be referred to each other. For a system disclosed by the embodiments, because the system corresponds to a method disclosed by the embodiments, the system is simply described. Refer to the description of the method part for the related part. It should be indicated that, for those ordinary skilled in the art, several improvements and modifications can also be made to the present disclosure without departing from the principle of the present disclosure, and these improvements and modifications fall into the protection scope of claims of the present invention.

It should be indicated that relationship terms of "first", "second" and the like in the description are just for differentiating one entity or operation from the other entity or operation, and do not necessarily require or imply any practical relationship or sequence between the entities or operations. Moreover, terms of "comprise", "include" or any other variant are intended to cover non-exclusive inclusion, so that a process, a method, an article or a device which includes a series of elements not only includes such elements, but also includes other elements not listed clearly or also includes inherent elements in the process, the method, the article or the device. In case of no more limitation, the elements defined by a sentence "include one . . . " do not exclude additional identical elements in the process, the method, the article or the device which includes the elements.

I claim:

1. A roll-to-roll device for processing flexible material, comprising:
    triaxial acceleration vibration sensors installed on a unwinding roller, a guiding roller, a driving roller and a winding roller respectively and configured for collecting vibration data;
    a memory for storing computer programs; and
    a processor for executing computer programs, wherein the computer programs are executed to perform operations of :
    calculating a first root mean square value and a first kurtosis value of vibration data of each of all rollers of the roll-to-roll device working in a normal state;
    for each of the rollers, executing fuzzy division operation on the respective first root mean square value to obtain a first fuzzy prototype, and executing fuzzy division operation on the respective first kurtosis value to obtain a second fuzzy prototype;
    calculating a second root mean square value and a second kurtosis value of the vibration data of each of the rollers of the roll-to-roll device for processing flexible material within a target time period;
    for each of the rollers, calculating a first membership degree function between the respective second root mean square value and the respective first fuzzy prototype , and setting calculating results of the first membership degree function as first-type performance degradation index values, wherein the respective second root mean square value is an input sample of the first membership degree function;
    for each of the rollers, calculating a second membership degree function between the respective second kurtosis value and the respective second fuzzy prototype , and setting calculating results of the second membership degree function as second-type performance degradation index values, wherein the respective second kurtosis value is an input sample of the second membership degree function; and
    determining a performance state of the roll-to-roll device for processing flexible material within the target time period according to all of the first-type performance degradation index values and all of the second-type performance degradation index values for all of the rollers.

2. The roll-to-roll device according to claim 1, wherein while determining the performance state of the roll-to-roll device for processing flexible material within the target time period according to all of the first-type performance degradation index values and all of the second-type performance degradation index values for all of the rollers, the computer programs are further executed by the processor to perform operations of :
    respectively averaging the calculating results of all of the first-type performance degradation index values of all of the rollers and all of the second-type performance degradation index values of all of the rollers to obtain a first-type average performance degradation index value and a second-type average performance degradation index value, and determining the performance state of the roll-to-roll device for processing flexible material within the target time period according to the first-type average performance degradation index value and the second-type average performance degradation index value.

3. The roll-to-roll device according to claim 2, wherein while determining the performance state of the roll-to-roll device for processing flexible material within the target time period according to the first-type average performance degradation index value and the second-type average performance degradation index value , the computer programs are further executed by the processor to perform operations of:
    judging whether a variation amount of the first-type average performance degradation index value is larger than a first preset value within a first preset time;
    if yes, determining that the performance state of the roll-to-roll device for processing flexible material is in a later stage of life;
    judging whether a variation amount of the second-type average performance degradation index value is larger than a second preset value within a second preset time; and
    if yes, determining that the performance state of the roll-to-roll device for processing flexible material is in an end stage of life.

4. The roll-to-roll device according to claim 1, wherein calculating the first membership degree function between the respective second root mean square value and the respective first fuzzy prototype, for each of the rollers, the computer programs are further executed by the processor to perform operations of:
    calculating a first membership degree function $\mu_1$ of an unwinding roller between the respective second root mean square value and the respective first fuzzy prototype for the unwinding roller, wherein the first membership degree function of the unwinding roller is $$\mu_1(x_1) = e^{-\frac{(x_1 - v_{ix_1})^2}{\sigma_{ix_1}^2}} \;;$$

$x_1$ is the second root mean square value for the unwinding roller, $v_{ix_1}$ is a fuzzy clustering center of the first root mean square value for the unwinding roller in the first fuzzy prototype; and $\sigma_{ix_1}^2$ is a fuzzy division region width of the first root mean square value c for the unwinding roller in the first fuzzy prototype; calculating a first membership degree function $\mu_2$ of a guiding roller between the respective second root mean square value and the respective first fuzzy prototype for the guiding roller, wherein the first membership degree function of the guiding roller is $$\mu_2(x_2) = e^{\frac{(x_2 - v_{ix_2})^2}{\sigma_{ix2}^2}} ;$$

$x_2$ is the second root mean square value for the guiding roller; $v_{ix2}$ is a fuzzy clustering center of the first root mean 2 square value for the guiding roller in the first fuzzy prototype; and $\sigma_{ix2}^2$ is a fuzzy division region width of the first root mean square value for the guiding roller in the first fuzzy prototype;

calculating a first membership degree function $\mu_3$ of a driving roller between the respective second root mean square value and the respective first fuzzy prototype for the driving roller, wherein the first membership degree function of the driving roller is $$\mu_3(x_3) = e^{\frac{(x_3 - v_{ix_3})^2}{\sigma_{ix3}^2}} ;$$

$x_3$ is the second root mean square value for the driving roller; $v_{ix3}$ is a fuzzy clustering center of the first root mean square value for the driving roller in the first fuzzy prototype; and $\sigma_{ix3}^2$ is a fuzzy division region width of the first root mean square value for the driving roller in the first fuzzy prototype; and calculating a first membership degree function $\mu_4$ of a winding roller between the respective second root mean square value and the respective first fuzzy prototype for the winding roller, wherein the first membership degree function of the winding roller is $$\mu_4(x_4) = e^{\frac{(x_4 - v_{ix_4})^2}{\sigma_{ix4}^2}} ;$$

$x_4$ is the second root mean square value for the winding roller, $v_{ix4}$ is a fuzzy clustering center of the first root mean square value for the winding roller in the first fuzzy prototype; and $\sigma_{ix4}^2$ is a fuzzy division region width of the first root mean square value for the winding roller in the first fuzzy prototype; and wherein the calculating the second membership degree function between the respective second kurtosis value and the respective second fuzzy prototype for each of the rollers, comprises:

calculating a second membership degree function $\mu_5$ of the unwinding roller between the respective second kurtosis value and the respective second fuzzy prototype for the unwinding roller, wherein the second membership degree function of the unwinding roller is $$\mu_5(x_5) = e^{\frac{(x_5 - v_{ix_5})^2}{\sigma_{ix5}^2}} ;$$

$x_5$ is the second kurtosis value for the unwinding roller, $v_{ix5}$ is a fuzzy clustering center of the first kurtosis value for the unwinding roller in the second fuzzy prototype; and $\sigma_{ix5}^2$ is a fuzzy division region width of the first kurtosis value for the unwinding roller in the second fuzzy prototype;

calculating a second membership degree function $\mu_6$ of the guiding roller between the respective second kurtosis value and the respective second fuzzy prototype for the guiding roller, wherein the second membership degree function of the guiding roller is $$\mu_6(x_6) = e^{\frac{(x_6 - v_{ix_6})^2}{\sigma_{ix6}^2}} ;$$

$x_6$ is the second kurtosis value for the guiding roller, $v_{ix6}$ is a fuzzy clustering center of the first kurtosis value for the guiding roller in the second fuzzy prototype; and $\sigma_{ix6}^2$ is a fuzzy division region width of the first kurtosis value for the guiding roller in the second fuzzy prototype;

calculating a second membership degree function $\mu_7$ of the driving roller between the respective second kurtosis value and the respective second fuzzy prototype for the driving roller, wherein the second membership degree function of the driving roller is $$\mu_7(x_7) = e^{\frac{(x_7 - v_{ix_7})^2}{\sigma_{ix7}^2}} ;$$

$x_7$ is the second kurtosis value for the driving roller, $v_{ix7}$ is a fuzzy clustering center of the first kurtosis value for the driving roller in the second fuzzy prototype; and $\sigma_{ix7}^2$ is a fuzzy division region width of the first kurtosis value for the driving roller in the second fuzzy prototype; and calculating a second membership degree function $\mu_8$ of the winding roller between the respective second kurtosis value and the respective second fuzzy prototype for the winding roller, wherein the second membership degree function of the winding roller is $$\mu_8(x_8) = e^{\frac{(x_8 - v_{ix_8})^2}{\sigma_{ix8}^2}} ;$$

$x_8$ is the second kurtosis value for the winding roller, vixs is a fuzzy clustering center of the first kurtosis value for the winding roller in the second fuzzy prototype; and $\sigma_{ix8}^2$ is a fuzzy division region width of the first kurtosis value for the winding roller in the second fuzzy prototype.

5. The roll-to-roll device according to claim 1, wherein after determining the performance state of the roll-to-roll device for processing flexible material within the target time period according to all of the first-type performance degradation index values and all of the second-type performance degradation index values for all of the rollers, the computer programs are further executed by the processor to perform operations of:

judging whether the performance state satisfies normal working requirements to the roll-to-roll device for processing flexible material; and if no, outputting prompt information for replacing the rollers.

* * * * *